May 8, 1951   C. J. JENNY   2,552,377
ALTIMETER
Filed Feb. 8, 1945   2 Sheets-Sheet 1
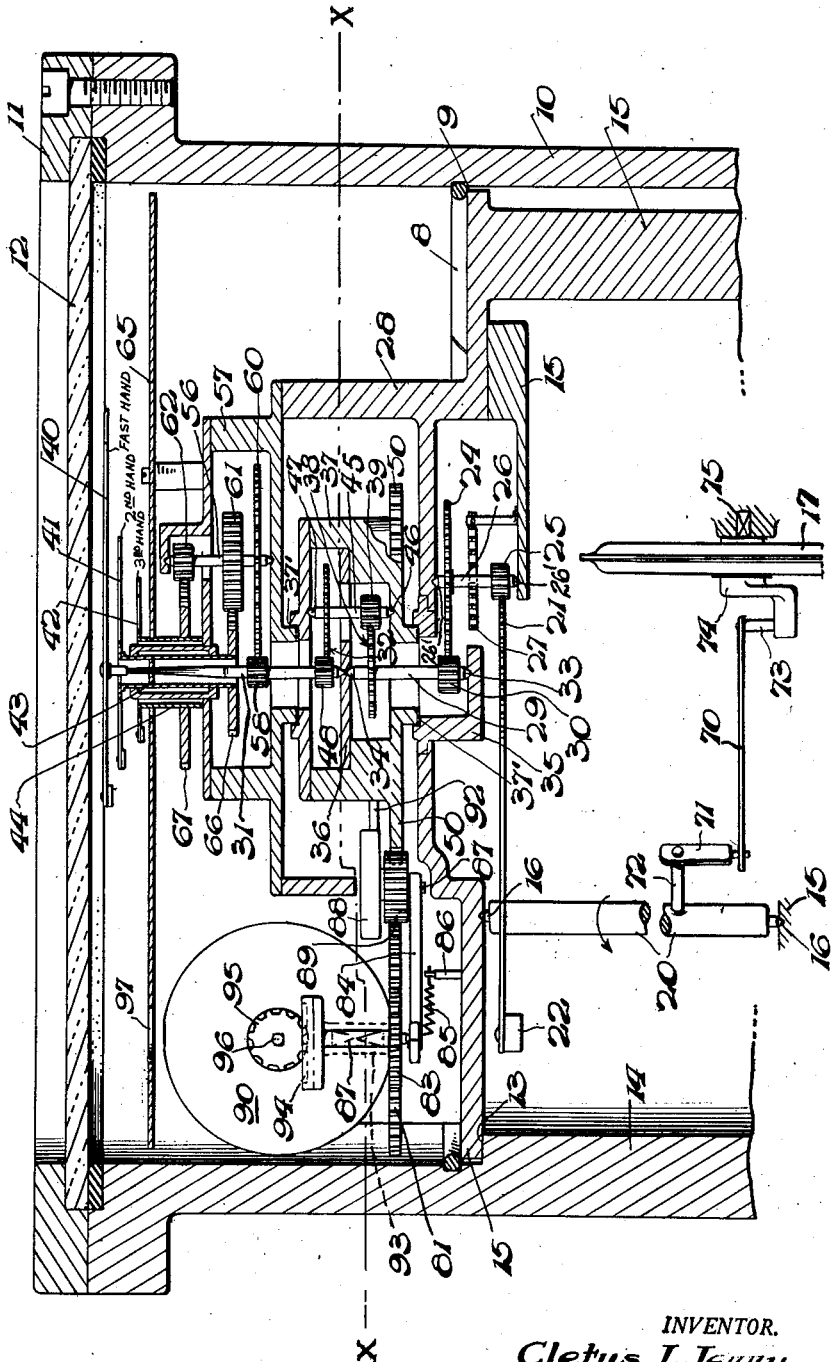
INVENTOR.
Cletus J. Jenny
BY
Walman
ATTORNEY May 8, 1951

C. J. JENNY 2,552,377

ALTIMETER

Filed Feb. 8, 1945

INVENTOR.
Cletus J. Jenny.
BY
*J. Walman*
ATTORNEY

Patented May 8, 1951

2,552,377

UNITED STATES PATENT OFFICE 2,552,377

ALTIMETER

Cletus J. Jenny, Clifton, N. J., assignor to Bendix Aviation Corporation, Teterboro, N. J., a corporation of Delaware Application February 8, 1945, Serial No. 576,801

5 Claims. (Cl. 73—387)

1

The present invention relates generally to barometric pressure instruments and particularly to improved sensitive altimeters for aircraft.

It is well known to those skilled in the art that an altimeter, such as usually includes a dial graduated in feet and provided with a plurality of pointers for measuring altitudes will indicate altitude with respect to a standard barometric pressure at sea level, but will not indicate the true altitude with respect to the ground at various or remote points not at sea level. For example, the pointers will indicate zero only when the instrument is at sea level under such normal standard conditions.

Heretofore, for example, in order to give true altitude measurements with respect to any ground altitude, various arrangements have been provided for adjusting the pointers to indicate zero when the instrument is on the ground regardless of the altitude of the ground with respect to sea level. Also, arrangements have been provided for setting the instrument pointers for one condition of ground altitude with respect to a second condition of altitude at some other location. However, such setting arrangements are not entirely independent of the altitude sensitive diaphragm and they either change the datum of the diaphragm or bodily move the entire diaphragm linkage assembly in order to prevent changing the datum during setting.

Accordingly, an object of the present invention is to provide improved novel means, whereby the several pointers of an altimeter may be set and reset to indicate zero when the instrument is on the ground and for giving the true altitude or elevation of an aircraft above the ground at any point or location regardless of the altitude of the ground with respect to sea level whether the ground is at, above or below sea level and without disturbing the indicating position of the altimeter barometric or atmospheric pressure sensitive element, aneroid or diaphragm.

Another object of the invention is to provide novel improvements in sensitive altimeters for aircraft.

Another object is to provide a novel gear train arrangement for increasing the range of altitude indications of a sensitive altimeter.

Another object is to provide novel setting means in pointer driving gear trains of sensitive altimeters, comprising a planetary gear arrangement adapted to be rotated externally of the altimeter casing for setting the pointers of the altimeter according to a barometric pressure scale.

2

Another object is to provide in an indicating instrument of the class described, improved novel means for setting the pointers of the instrument to indicate for a known altitude at or from a point of destination, so that at such point, the altimeter will show zero when the wheels of the aircraft touch the ground irrespective of any known variation in barometric pressure at the ground point of destination elevation or altitude at such point, even though not at sea level.

A further object is to provide novel means adapted to interconnect a barometric counter with a novel planetary gear train arranged to obtain variable motion between the counter and the planetary gear train.

The above and other objects will appear more fully hereinafter from the following detailed description when taken in connection with the accompanying drawings. It is to be expressly understood, however, that the drawings are for the purposes of illustration only and are not designed as a definition of the limits of the invention, reference being had for this purpose to the appended claims.

In the drawings wherein similar reference characters denote similar parts throughout the several views:

Figure 1 is a cross section view of one form of a sensitive altimeter designed according to my invention.

Figure 2:
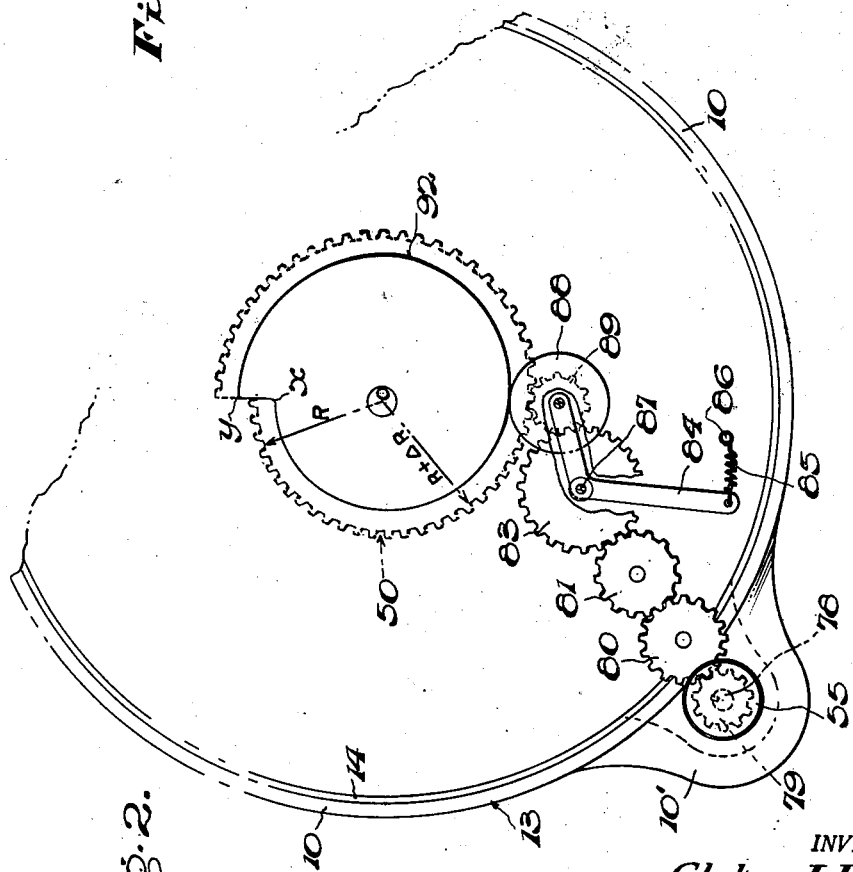
Figure 2 is a top plan view of the pointer setting means, taken substantially along the line x—x of Figure 1 so as to show the novel pointer setting means for use in combination with a barometric counter.

Referring to the drawings in detail, and first particularly with reference to Figures 1 and 2, my novel sensitive altimeter includes a main casing 10, sealed by a bezel cover 11, including the usual window glass 12. Within the casing 10 and seated on top edge 13 of two or more risers or elongated ribs 14 is a base frame 15 adapted to be locked in the casing against edges 13 by a snap ring 8 in groove 9. Vertically journaled in bearings, such as shown at 16, is a rock shaft 20 arranged to carry near its top end a sector gear 21 movable in response to the changes in a barometric pressure diaphragm or aneroid 17, as shown in Figures 1 and 2, as hereinafter described.

The sector gear 21 may be suitably balanced as by a weight 22, and drives idler gear 24 by meshing with pinion gear 25 on an idler gear staff 26 journaled in bearings 26' in the case or frame. Such staffs are interchangeably referred to as spindles, bars or shafts. On idler staff 26 is also mounted a hair spring 27, which is fixed at one end to the staff and anchored at the other end to the frame, and functions to remove, take up or absorb backlash in the planetary between the sector gear 21 and its pinion 25. In this location, the hair spring or blacklash take-up means, affects all of the fast trains and connections from the pinions 24 and 25 back to the diaphragm 17 in removing backlash without having an excessive number of turns.

Seated on several cooperating surfaces or shoulders of the base frame 15 is an upper framework or housing 28 which supports driving mechanism, arranged so that a staff, spindle, shaft or arbor 29 having mounted thereon a fast hand train including a pinion 30 in mesh with idler gear 24, is in vertical alignment with a fast hand shaft 31. The staff 29 is journaled for rotation in bearing members 33 and 34 in brackets 35 and 36, respectively, and carries a gear 38 at its upper end adapted to mesh with a pinion 39 on a stub shaft 45 journaled in a planetary or cam gear casting 37 journaled at 37' in portions 35 and 57 of the framework or case 28, which shaft 45 carries a gear 32, as a part of my novel planetary gear train adapted either for setting the altimeter pointers 40, 41 and 42 fixed to shafts 31, 43 and 44, respectively, over a stationary dial 65, anchored to portion 57 as hereinafter explained, or for driving the pointers if the setting thereof is correct. The shaft bearings may be and preferably are jewel bearings.

Figure 3:
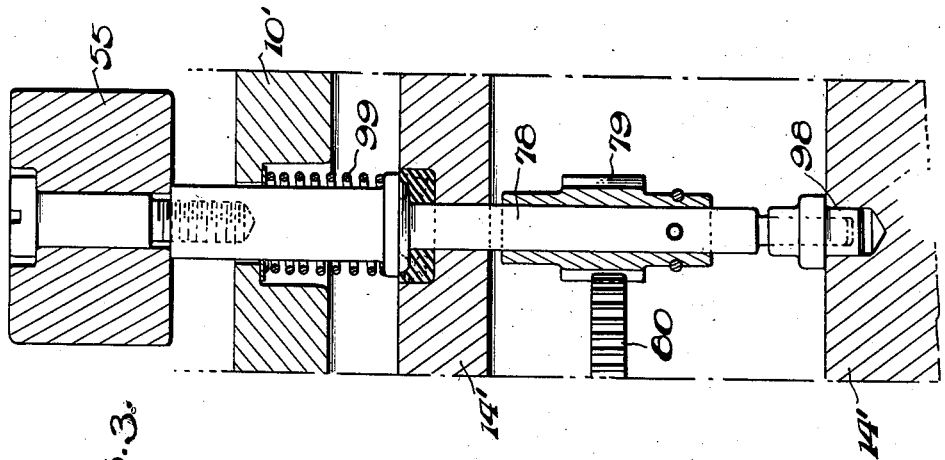
Figure 3 is a longitudinal cross section area of the barometric counter and altimeter pointers' setting knob and pinion arrangement for connection with the novel planetary gear train shown in Figures 1 and 2.

Normally the driving connection to the several pointers 40, 41 and 42 is imparted thereto by rotation of the planetary gearing described, including the idler gear 24, pinion 30, shaft 29, gear 38, and pinion 39 and gear 32 fixed to stub shaft 45 mounted in bearing surfaces 46 and 47 directly within gear casting 37, and eccentrically or radially outwardly of or spaced from the center axis of a relatively large planetary carrier and cam gear 50, which gear 50 is shown formed at the bottom of planetary casting 37 in Figure 1 and only rotates when it is manually driven by turning the knob 55 from outside the casing 10 as shown in Figures 1, 3 and 4. While gear 50 is stationary, a drive from the diaphragm 17 effected through gear 32 on stub shaft 45 is normally provided through fast hand shaft pinion 48 to the second and third slow hands or pointers through the slow gear train journaled for rotation with a shaft 56 journaled in a superimposed top frame 57 and comprising a plurality of any suitable number, but preferably three or four pairs of intermeshing pinions and gears. This drive from the diaphragm 17 is through sector 21, pinion 25, shaft 26, gear 24, pinion 30, shaft 29, gear 38, pinion 39 and shaft 45 to gear 32 to the slow hands through the shaft 56 and slow gear train as above specified. If gear 50 is turning, then gear 24, pinion 30 and gear 38 do not turn and the meshing gears or pinions planetate, but all gears and pinions from 39 up, including the slow train, turn.

Each gear and pinion of the slow gear train has a particular speed with certain speed ratios between each pair of coengaged gears and pinions, so as to provide for different speeds of rotation for each pointer. These may be as follows:

FAST TRAIN
*Figures 1 and 2*

| Nos. | Pinions | No. Teeth | Turns |
|---|---|---|---|
| 1 | 48 Fast Pinion | 20 | 55 |
| 2 | 32 | 40 | 27½ |
| 3 | 39 | 20 | 27½ |
| 4 | 38 | 40 | 13¾ |
| 5 | 30 | 25 | 13¾ |
| 6 | 24 Idler | 200 | 1²³⁄₃₂ |
| 7 | 25 | 30 | 1²³⁄₃₂ |
| 8 | 21 Sector | 300 | 61⅞° |

FAST TRAIN

| Nos. | Pinions | No. Teeth | Turns |
|---|---|---|---|
| 1 | 48 Fast Pinion | 20 | 55 |
| 2 | 32 Idler | 120 | 9¹⁄₁₆ |
| 3 | 39 | 20 | 9¹⁄₁₆ |
| 4 | 38 Idler | 120 | 1.53 |
| 5 | 25 | 36 | 1.53 |
| 6 | 21 Sector | 324 | 61.1° |

SLOW TRAIN

| Nos. | Pinions | No. Teeth | Turns |
|---|---|---|---|
| 1 | 48 Fast Hand Pinion | 20 | 55 |
| 2 | 58 Barrel Pinion | 12 | 55 |
| 3 | 60 | 60 | 11 |
| 4 | 61 | 24 | 11 |
| 5 | 66 2nd Hand Wheel | 48 | 5½ |
| 6 | 62 | 6 | 11 |
| 7 | 67 3rd Hand Wheel | 66 | 1 |

FAST TRAIN

| Nos. | Pinions | No. Teeth | Turns |
|---|---|---|---|
| 8 | 39 Idler | 12 | 11 |
| 9 | 38 Idler | 60 | 2½ |

For example, the fast hand shaft 31 carries a second pinion 58 above pinion 48. This pinion 58 drives the slow gear train shaft 56, by meshing with a gear 60, which is the relatively largest gear of the said train, so that shaft 31 and pointer 40 fixed thereto rotate a greater predetermined number of revolutions for a suitable high elevation such as 55,000 ft. with respect to pointer 41, and with respect to one revolution of pointer 42 for 55,000 feet.

Pointers 41 and 42 are respectively mounted on the hollow shafts 43 and 44, which carry the said pointers at their respective upper ends over the dial 65 stationarily supported on the frame structure in the casing, and shafts 43 and 44 respectively carry gears 66 and 67 fixed thereto near or at their lower ends, to provide drives of relatively different ratios to respectively mesh with the slow train gears 61 and 62 on shaft 56 and provide for their different speeds of rotation and of the pointers or hands 40, 41 and 42. For example, gear 66 on the second hand hollow shaft 43 meshes with gear 61 on the slow gear train shaft 56, which gear 61 is proportionally smaller than gear 60 in mesh with pinion 58, and gear 67 on the third hand hollow shaft 44 meshes with gear 62, which is proportionally smaller than gear 61 adapted to drive the second hand shaft 43 through gear 66, to drive shaft 44 and slow or third hand 42.

Thus, the several pointers 40, 41 and 42 are proportionally rotated by the different gear ratios of their driving gears at different speeds over the surface of the dial 65, which is graduated for altitude in feet to thereby additively indicate various altitudes in feet, when movement is imparted to the pointers from the barometric pressure sensitive element 17 as will now be described.

As shown in Figure 1 the rock shaft 20 connects to the diaphragm 17 by a suitable temperature compensating arrangement, such as link 70 pivoted at one end to a crank including a range controlling bimetal arm 71 fixedly mounted on an arm 72 secured to the rock shaft 20, and said link 70 being pivoted at the other end to a zero compensating bimetal arm or stud 73 fixed in bracket 74 attached to the center of one side of the diaphragm 17 having a central mounting post 75 suitably supported, as in the casing frame structure.

Before describing the form illustrated in Figure 2 in detail, the resetting mechanism shown in Figures 1, 3 and 4 will first be referred to in detail.

PLANETARY SETTING MECHANISM

The novel arrangement of the gear trains to the several pointers is so organized that the large planetary casting 37 and cam gear 50 formed or fixed thereon, may be rotated from outside casing 10 by knob 55 on a manual setting shaft 78 journaled in a hollow extension or boss 10' at one side of the casing 10, preferably parallel to the pointer axes, through pinion 79 fixed to shaft 78 in mesh with a gear set or train comprising gears 80, 81, and 83. Gear or pinion 79 meshes with gear 80 which in turn meshes with gear 81 which also meshes with gear 83. The latter may be larger than the others or they may be progressively larger or otherwise. Gear 83 of this set has pivoted thereto about its axis a bell crank or obtuse angled arm 84, one end of which at the free end of the long arm thereof is attached by a biasing or torque exerting spring 85 which is suitably anchored, such as to an anchor pin 86 on upper framework 28 on base frame 15, as shown in Figure 1, and the intermediate or angular portion of which is pivoted at 87 while the other end or short arm of the crank arm 84 has journaled thereon or rotatably supports a floating pivot or shaft on which turns a guide roller 88 and driving pinion 89. The pinion or gear 89 can roll on the gear 83 and float with the roller 88 into and out of engagement with the variable pitch-radius planetary or cam gear 50 and a similar cam 92 fixed therewith as by being rigid with the cam gear 50 or casting 37.

The driving pinion 89 while in mesh with gear 83 is held by spring 85 in mesh with the large cam gear 50, which is a part of the planetary gear train, the rest of which includes gears 38, 39, and 32. For example, when cam gear 50 is rotated, the pinion 36, idler gear 24 and gear 38 remain stationary and gears 39 and 32 planetate around gear 38 and drive pinion gear 48 to set the pointers without disturbing the diaphragm's position. By providing for uniform motion of the counter 90 and the setting train or gearing 79, 80 and 81 associated with gear 83, the motion of the planetary may be variable, as shown, primarily due to the variable pitch-radius of the planetary cam gear 50. For example, floating drive pinion 89 is kept in mesh with gear 83 and large planetary cam gear 50 by the fixed radius of the short arm of the bell crank lever or angular arm 84, which pivots about the axis 87 of the fulcrum gear 83, and at the same time, the drive pinion 89 is retained in mesh with the teeth of the planetary cam gear 50 by the torque caused or exerted by the spring or biasing means 85, and the proper degree of mesh is obtained by guide wheel or roller 88 carried on the same axis of rotation as the drive pinion 89, by the planetary guide or templet cam 92 on which the wheel or roller 88 rolls or is guided on casting 37 and cam gear 50 of the same general outline, as that made by the ends of the said cam gear's teeth. That is, the cam is eccentric and the motion of the planetary gearing or drive connection is variable, due to the variable pitch-radius of the gear 50 and cam 92, both with the axis 0 and radii $R$ and $R+\Delta R$ as indicated in Figure 3; the latter progressively increasing from one end $X$ or $R$ to the other end $y$ or $R+\Delta R$ extended to its limit or reversely decreasing in the opposite direction from $y$ or the limit of $R+\Delta R$ to $R$ or $X$ about the axis 0.

In a bracket 93 attached to the inside of casing 10 there is journaled the axis or shaft 87, one end of which is keyed to gear 83. At the top of the driven shaft 87, may be a crown gear 94, which in its turn is in mesh with a pinion 95 on the horizontal driven shaft 96 of the barometric counter 90 the reading of which is visible through a window or sight opening 97 in the dial 65. The shaft 78 with the removable knob 55 may be mounted as shown in Figures 2 and 3 at 98 and held down by a spring 99.

OPERATION

Thus in operation, when the pointers 40, 41 and 42 are to be set with the counter 90 or either set to a desired or particular altitude reading or to a particular barometric pressure reading, which will appear through window 97 in the dial 65, there is provided the necessary predetermined variable motion between the planetary gear train and the barometric counter connections to thereby rotate its mechanism to proper coincidence with the pointer hands when they are set by manually turning the shaft 78 with the knob 55.

As a typical example, suppose an airplane in which the altimeter is mounted takes off from an airport, the elevation of which is precise sea-level and a barometric pressure of 29.92. The pilot being informed of this barometric pressure may then set the altimeter pointers, so that they will be operating from zero for the barometric pressure of 29.92 at the take-off airport. However, the terminal airport, which may be 500 miles away, has a sea level barometric pressure reading of 29.38 instead of 29.92 inches of mercury, and the pilot may be so informed by radio as he prepares for landing to land at a reading of zero. This lower pressure causes the altimeter to give an altitude indication of 500 feet more than the true altitude, and if the airplane were to land without setting the pointers to the barometric pressure of the terminal airport, the altimeter would indicate an altitude of 500 feet at the moment the wheels of the craft touched the ground. The pilot, however, upon being notified of the prevailing barometric pressure at the ground level of this terminal airport, resets his barometric scale and/or altitude pointers from knob 55, which by virtue of its pinion 79, and the variable motion of floating drive pinion 89 in mesh with the planetary carrier cam gear 50, will set the counter or dial and/or pointer hands proportionally to zero with respect to ground level for the new radio communicated reading 29.38 or other altitude and pressure of the barometric counter 90 which is exposed through the window 97 in the dial 65 which is ordinarily controlled by and operated from the knob 55 with correct variable planetary motion to coordinate the barometric pressure indicator and the altitude indicators or pointers.

During such setting of the pointers the planetary gears 39 and 32 planetate around gear 38, which by virtue of its connection with the gear train of the pressure sensitive diaphragm through the hair spring 27 which takes up or removes backlash, is held stationary, with the result that the diaphragm's position is not disturbed, and its accuracy is not impaired; but pinion gear 48 on shaft 31 is not held stationary, and therefore rotates to thereby set the pointers 40, 41 and 42 as required to give true altitude readings at the new position or terminal airport or elevation above 500 feet so that a proper landing can be made.

While only one embodiment of the invention has been illustrated and described, other changes and modifications which will now appear to those skilled in the art, may be made without departing from the scope of the present invention. Reference is, therefore, to be had to the appended claims for a definition of the limits of the present invention.

I claim:

1. In an altimeter having a barometric pressure responsive aneroid, a barometric pressure counter device, a dial graduated for altitudes having an aperture therein to expose the registrations of said counter device, and a plurality of pointers rotatable above said dial; means for setting said pointers with respect to the registrations of said counter device, comprising a planetary cam-shaped carrier gear, a templet cam carried by said carrier gear, a floating pinion adapted to mesh with said carrier gear, guide means associated with said floating pinion adapted to roll around the said templet cam to thereby regulate the bite of the intermeshing teeth of said floating pinion and said carrier gear, yieldable means adapted to maintain said guide means in engagement with said templet cam, means for driving said floating pinion to thereby rotate said carrier gear, gear means driven by said floating pinion drive means adapted to cooperatively actuate said barometric counter as said carrier gear is rotated and said planetary gear is actuated, to thereby set said pointers, whereby an indication of a selected barometric pressure produces a corresponding pointer setting adapted to indicate true altitude for said selected barometric pressure at the ground level that said barometric pressure represents.

2. In an instrument having a condition responsive member, indicating means to show the condition measured, and drive means operative by said member upon changes in the conditions measured to actuate said indicating means; means for presetting the indicating means in accordance with a known condition, comprising a gear of increasing radius, setting means for rotating said gear, and planetary gearing rotatable upon rotation of said gear by said setting means, and coacting with the drive means of said instrument to preset said indicating means to a known condition.

3. In an indicating instrument having a condition responsive member, a dial, a pointer, and drive means operative by said member upon changes in the measured conditions to move said pointer with respect to said dial; means for presetting said pointer with respect to said dial in accordance with a known condition, comprising a spiral gear, setting means for rotating said spiral gear, and planetary gearing carried by said spiral gear coacting with the drive means of said instrument to preset said pointer with respect to said dial to indicate the known condition upon rotation of said spiral gear by said setting means.

4. In an instrument having a condition responsive member, indicating means, and drive means operative by said member upon changes in the conditions measured to actuate said indicating means; means for presetting the indicating means in accordance with a known condition, comprising a shaft rotatable by the condition responsive member of the instrument adapted to actuate the indicating mechanism thereof; a gear on said shaft, a spiral gear coaxial with said shaft, a planetary gear carried by said spiral gear and meshing with said first gear, and resetting means meshing with said spiral gear for rotating the same and its attendant planetary gear to preset the indicating mechanism to a known condition.

5. In an altimeter having a barometric pressure responsive aneroid including a barometric pressure scale means and a dial graduated for altitudes having an aperture therein to expose a part of said barometric scale means, and a plurality of pointers rotatable about said dial, setting means comprising a driving gear train connected to said barometric scale means to provide a reading of the said barometric scale through the aperture in the said dial, and a variable drive including a gear of increasing radius actuated by said setting means adapted to correspondingly set the said altimeter to a starting cycle of zero with respect to a ground level having a barometric pressure corresponding to the setting of said barometric pressure scale, said latter means including a pressure responsive member operatively connected to the gears, and resilient means interposed in the connection to take up back-lash on the operative connection to the pressure responsive means.

CLETUS J. JENNY.

REFERENCES CITED

The following references are of record in the file of this patent:

UNITED STATES PATENTS

| Number | Name | Date |
|---|---|---|
| 1,970,544 | Carbonara | Aug. 21, 1934 |
| 2,099,467 | Carbonara | Nov. 16, 1937 |
| 2,260,541 | Schwenn | Oct. 28, 1941 |
| 2,325,282 | Schwenn | July 27, 1943 |
| 2,355,990 | Menzer | Aug. 15, 1944 |